ranged to enter said seats and to engage the face of said disk for holding it in engaged position, a spring for holding said shiftable clutch disk in disengaged position, a cam independent of said abutment for positively shifting the same to engaged position, devices for operating said cam, a sleeve having a shoulder on said shaft, said loose clutch disk being mounted on said sleeve, a spring for yieldingly holding said loose clutch disk against said shoulder and means for adjusting the position of said sleeve and spring along said shaft and for holding the same in adjusted position, substantially as described.

EDWARD M. HEYLMAN.

Witnesses:
W. F. BOSWORTH,
S. C. COBB.

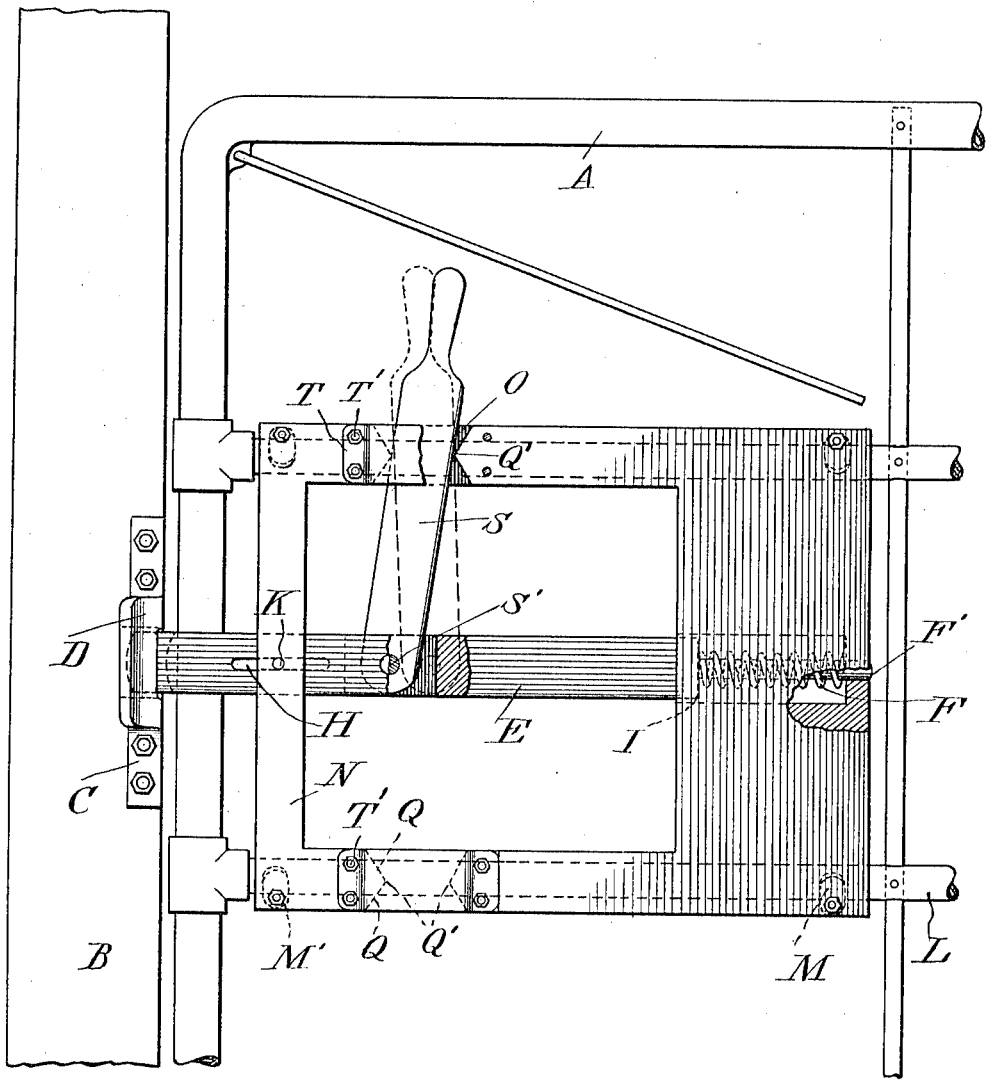

Copies of this patent may be obtained for five cents each, by addressing the "Commissioner of Patents, Washington, D. C."